United States Patent
Calendrille, Jr. et al.

(10) Patent No.: US 11,124,270 B2
(45) Date of Patent: Sep. 21, 2021

(54) CHAIN GUIDE ASSEMBLY

(71) Applicant: TEKTRO TECHNOLOGY CORPORATION, Changhua County (TW)

(72) Inventors: John L. Calendrille, Jr., Port Jefferson, NY (US); Chung-Sheng Tsai, Changhua County (TW)

(73) Assignee: TEKTRO TECHNOLOGY CORPORATION, Changhua County (TW)

(*) Notice: Subject to any disclaimer, the term of this patent is extended or adjusted under 35 U.S.C. 154(b) by 259 days.

(21) Appl. No.: 16/379,972

(22) Filed: Apr. 10, 2019

(65) Prior Publication Data

US 2019/0329842 A1    Oct. 31, 2019

(30) Foreign Application Priority Data

Apr. 25, 2018  (TW) .................................. 107113984

(51) Int. Cl.
| | | |
|---|---|---|
| *B62M 9/126* | (2010.01) | |
| *B62M 9/1248* | (2010.01) | |
| *B62M 9/121* | (2010.01) | |
| *B62M 9/1242* | (2010.01) | |

(Continued)

(52) U.S. Cl.
CPC ............ *B62M 9/126* (2013.01); *B62M 9/121* (2013.01); *B62M 9/124* (2013.01);
(Continued)

(58) Field of Classification Search
CPC .................. B62M 9/121; B62M 9/124; B62M 2009/12406; B62M 2009/12413; B62M 9/1242; B62M 9/1244; B62M 9/1246; B62M 9/1248; B62M 9/125; B62M 9/126; B62M 9/127; B62M 9/131; B62M 9/134; B62M 9/1342; B62M 9/1344;
(Continued)

(56) References Cited

U.S. PATENT DOCUMENTS

| | | | | |
|---|---|---|---|---|
| 6,149,541 A | * | 11/2000 | Nakamura | ............. B62M 9/122 474/122 |
| 2002/0068653 A1 | * | 6/2002 | Dal Pra | .................... B62M 9/16 474/82 |

(Continued)

*Primary Examiner* — Michael R Mansen
*Assistant Examiner* — Raveen J Dias
(74) *Attorney, Agent, or Firm* — Locke Lord LLP; Tim Tingkang Xia, Esq.

(57) ABSTRACT

The disclosure provides a chain guide assembly including a movable member, a chain guide and a resistance applying assembly. The chain guide is pivotably disposed on the movable member. The resistance applying assembly includes a shaft seat, a first engagement component, a control component and a second engagement component. The shaft seat includes a seat portion and a flange portion. The seat portion is fixed on the chain guide. The flange portion is located at a side of the seat portion away from the chain guide and protrudes from the seat portion. The seat portion is disposed through the first engagement component. The first engagement component is clamped by the flange portion and the chain guide. The control component is disposed on the movable member. The second engagement component is pivotably disposed on the movable member and movable with the control component.

10 Claims, 9 Drawing Sheets

(51) Int. Cl.
*B62M 9/124* (2010.01)
*B62M 9/1244* (2010.01)

(52) U.S. Cl.
CPC ........ *B62M 9/1242* (2013.01); *B62M 9/1244* (2013.01); *B62M 9/1248* (2013.01)

(58) Field of Classification Search
CPC .. B62M 9/1346; B62M 9/1348; B62M 9/135; B62M 9/136; F16D 41/24; F16D 41/28; F16D 41/30; F16D 41/32
See application file for complete search history.

(56) References Cited

U.S. PATENT DOCUMENTS

| | | | | |
|---|---|---|---|---|
| 2012/0083371 A1* | 4/2012 | Yamaguchi | ............ | B62M 9/126 474/80 |
| 2012/0083372 A1* | 4/2012 | Yamaguchi | ............ | B62M 9/126 474/80 |
| 2012/0272771 A1* | 11/2012 | Lin | ........................ | B62M 9/124 74/473.13 |
| 2013/0288834 A1* | 10/2013 | Yamaguchi | .......... | B62M 9/1244 474/80 |
| 2013/0310204 A1* | 11/2013 | Shahana | ................ | B62M 9/121 474/80 |
| 2015/0072817 A1* | 3/2015 | Yamaguchi | ............... | F16H 7/10 474/113 |
| 2016/0304161 A1* | 10/2016 | Shirai | ..................... | B62M 9/126 |
| 2016/0375959 A1* | 12/2016 | Calendrille, Jr. | .... | B62M 9/1242 474/122 |
| 2017/0113760 A1* | 4/2017 | Lin | ...................... | B62M 9/1248 |
| 2017/0174289 A1* | 6/2017 | Wu | .......................... | B62M 9/16 |
| 2017/0343063 A1* | 11/2017 | Chan | .................... | B60B 27/047 |
| 2018/0274623 A1* | 9/2018 | Brown | .................... | B62M 9/126 |
| 2019/0047660 A1* | 2/2019 | Yang | ..................... | B62M 9/1248 |
| 2019/0063547 A1* | 2/2019 | Ziegler | .................. | B62M 9/126 |
| 2020/0166089 A1* | 5/2020 | Choltco-Devlin | ...... | F16D 41/16 |
| 2020/0317292 A1* | 10/2020 | Qin | ..................... | B62M 9/1248 |

* cited by examiner

CHAIN GUIDE ASSEMBLY

CROSS-REFERENCE TO RELATED APPLICATIONS

This non-provisional application claims priority under 35 U.S.C. § 119(a) on Patent Application No(s). 107113984 filed in Taiwan, R.O.C on Apr. 25, 2018, the entire contents of which are hereby incorporated by reference.

TECHNICAL FIELD

The disclosure relates to a bicycle transmission device, more particularly to a chain guide assembly of a bicycle derailleur.

BACKGROUND

Generally, a bicycle derailleur includes a chain guide that is able to shift the bicycle chain on the sprockets. In detail, the conventional bicycle derailleurs include a base member mounted to the bicycle frame, a movable member movably mounted on the base member, and the chain guide pivotably coupled to the movable member. As the movable member is moved relative to the base member, the chain guide moves the bicycle chain from one sprocket to another. Usually, there is a torsion spring disposed between the movable member and the chain guide for keeping the tension in the bicycle chain.

When the bicycle is riding on bumpy road, hitting a large hole in the road or a sharp bump might put large forces on the bicycle, causing the chain guide to pivot to an unwanted direction to loosen the bicycle chain. In this moment, the transmission efficiency is decreased, and the chain shifting becomes not smooth, and the bicycle chain may even fall off from the sprocket. To avoid that, some derailleurs have an additional resistance applying component disposed between the movable member and the chain guide for providing resistance to stop the chain guide from being moved toward the unwanted direction.

SUMMARY OF THE INVENTION

One embodiment of the disclosure provides a chain guide assembly configured to be mounted on a linkage assembly of a bicycle derailleur. The chain guide assembly includes a movable member, a chain guide and a resistance applying assembly. The movable member is configured to be mounted on the linkage assembly. The chain guide is pivotably disposed on the movable member. The resistance applying assembly is connected between the movable member and the chain guide. The resistance applying assembly includes a shaft seat, a first engagement component, a control component and at least one second engagement component. The shaft seat includes a seat portion and a flange portion. The seat portion is fixed on the chain guide, and the flange portion is located at a side of the seat portion away from the chain guide and protrudes from the seat portion in a radial direction of the seat portion. The seat portion is disposed through the first engagement component, and the first engagement component is clamped by the flange portion and the chain guide. The control component is disposed on the movable member and movable between an engaged position and a released position. The second engagement component is pivotably disposed on the movable member and movable with the control component. When the control component is in the engaged position, the first engagement component is unidirectionally and detachably engaged with the at least one second engagement component so that the first engagement component is only rotatable relative to the at least one second engagement component along a rotation direction. When the control component is moved from the engaged position to the released position, the at least one second engagement component is pushed by the control component to be detached from the first engagement component so that the first engagement component is rotatable relative to the at least one second engagement component along the rotation direction and a direction opposite to the rotation direction.

BRIEF DESCRIPTION OF THE DRAWINGS

The present disclosure will become better understood from the detailed description given herein below and the accompanying drawings which are given by way of illustration only and thus are not intending to limit the present disclosure and wherein.

DETAILED DESCRIPTION

Figure 1:
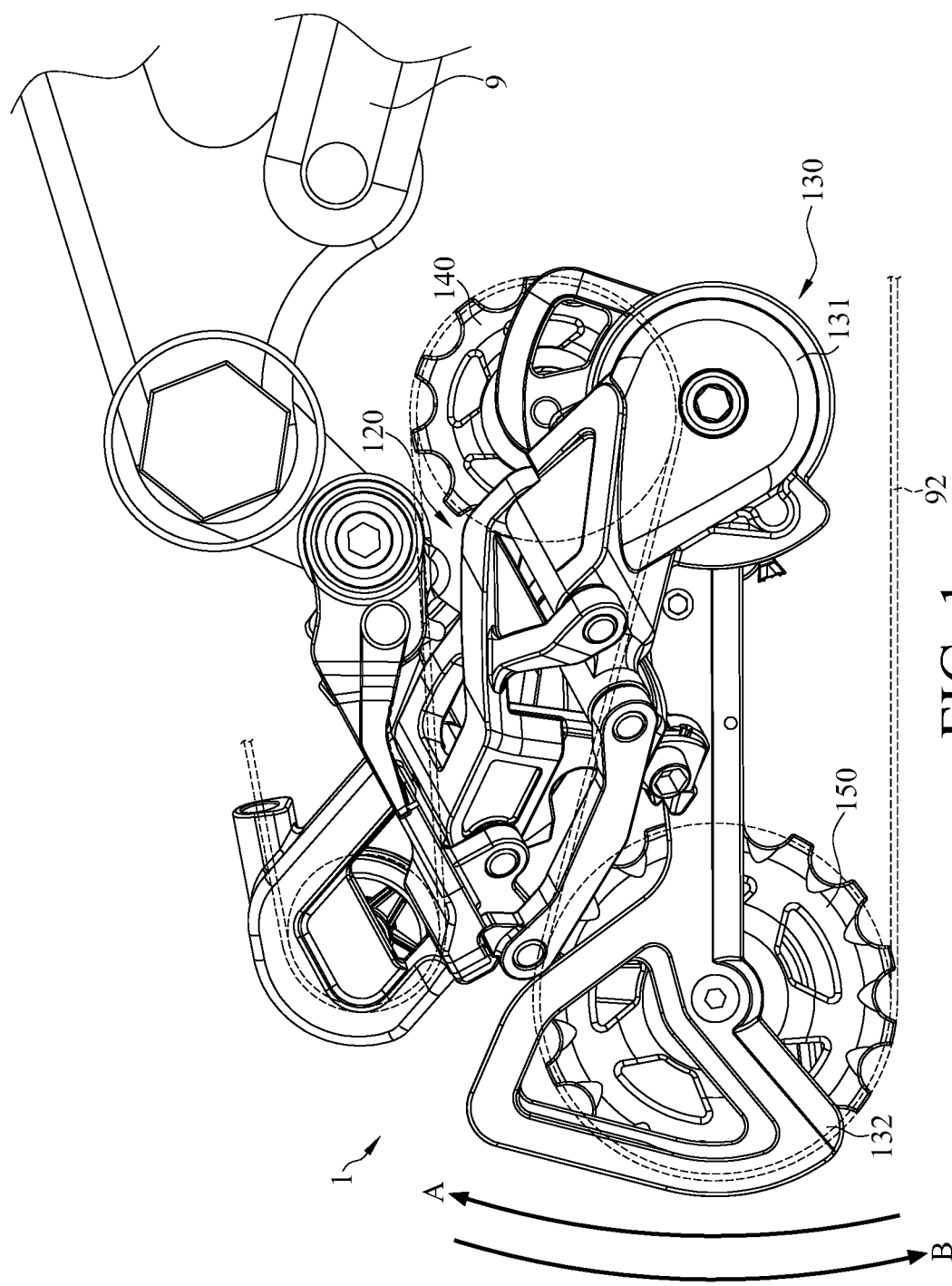
FIG. 1 is a partial rear part of a bicycle according to a first embodiment of the disclosure.
Figure 2:
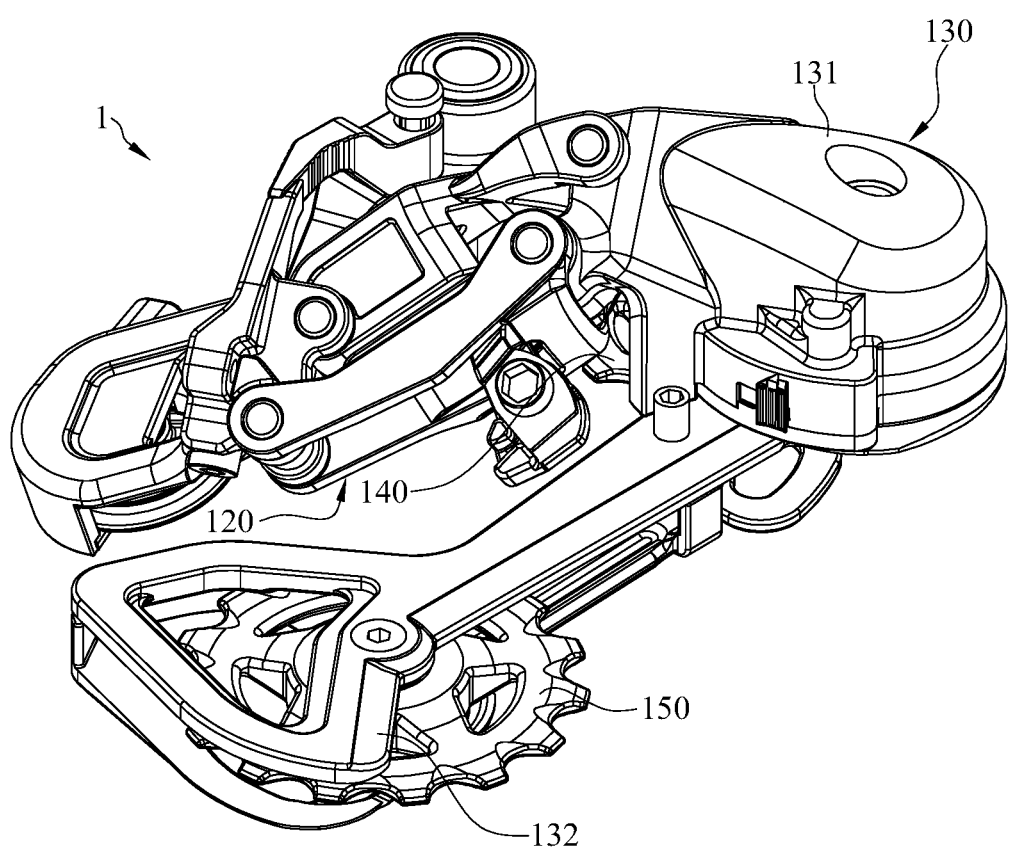
FIG. 2 is a perspective view of a derailleur in FIG. 1.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

In addition, the terms used in the present disclosure, such as technical and scientific terms, have its own meanings and can be comprehended by those skilled in the art, unless the terms are additionally defined in the present disclosure. That is, the terms used in the following paragraphs should be read on the meaning commonly used in the related fields and will not be overly explained, unless the terms have a specific meaning in the present disclosure.

Firstly, please refer to FIG. 1, FIG. 1 is a partial rear part of a bicycle according to a first embodiment of the disclosure.

This embodiment provides a bicycle derailleur 1 that is configured to be mounted on a bicycle frame 9. In detail, the bicycle derailleur 1 is adapted to be mounted on the rear part of the bicycle frame; in such a case, such that the bicycle derailleur 1 can also be called a rear derailleur 1. However, the bicycle derailleur 1 may still be simply called 'derailleur 1' hereinafter. In this embodiment, the derailleur 1 includes a linkage assembly 120, a chain guide assembly 130, a guide pulley 140 and a tension pulley 150. The guide pulley 140 and the tension pulley 150 are both disposed on the chain guide assembly 130, and the tension pulley 150 can be moved relative to the guide pulley 140 by being driven by the chain guide assembly 130. As shown in FIG. 1, there is a chain 92 looped on the guide pulley 140 and the tension pulley 150. The linkage assembly 120 is able to move the guide pulley 140 located on the chain guide assembly 130 so as to switch the chain 92 among a group of different-sized sprockets (not shown).

Figure 3:
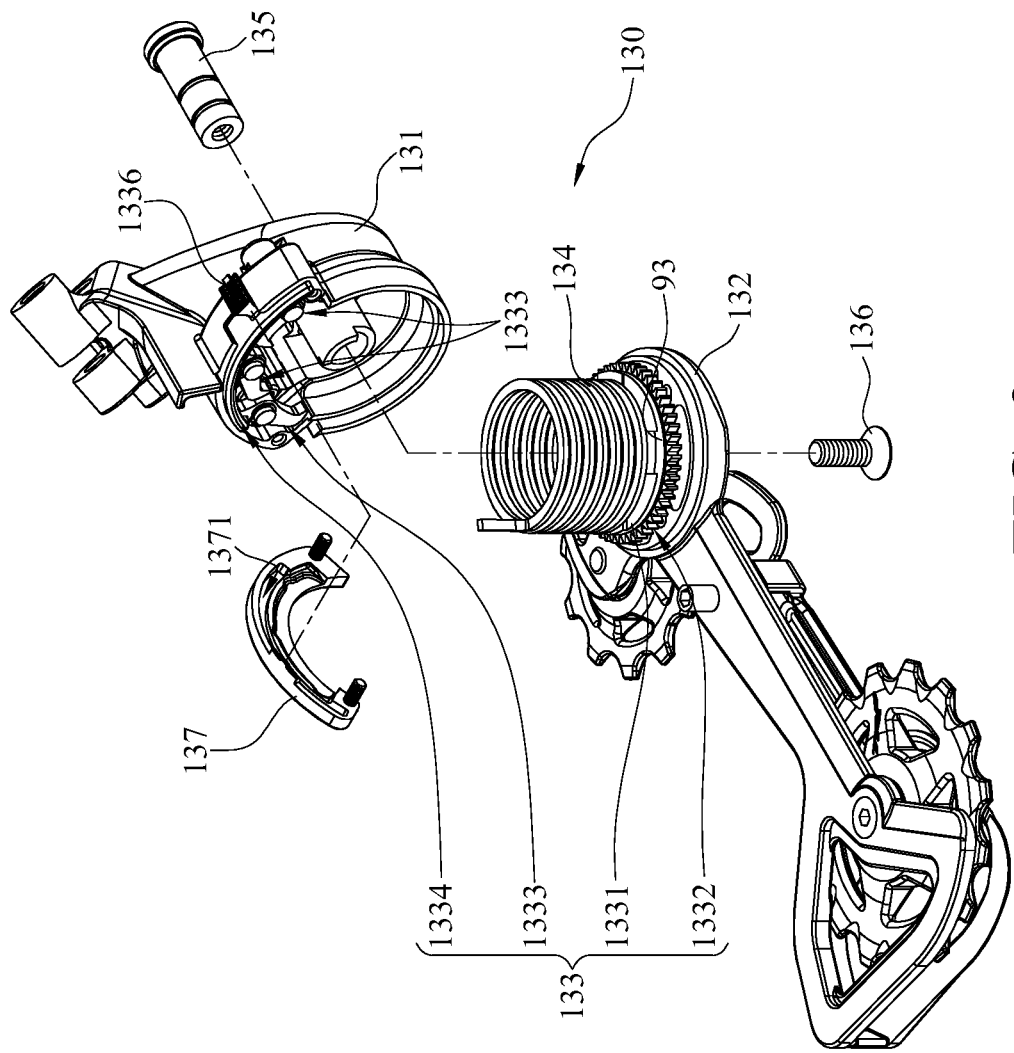
FIG. 3 is a partial exploded view of a chain guide assembly of the derailleur in FIG. 1.
Figure 4:
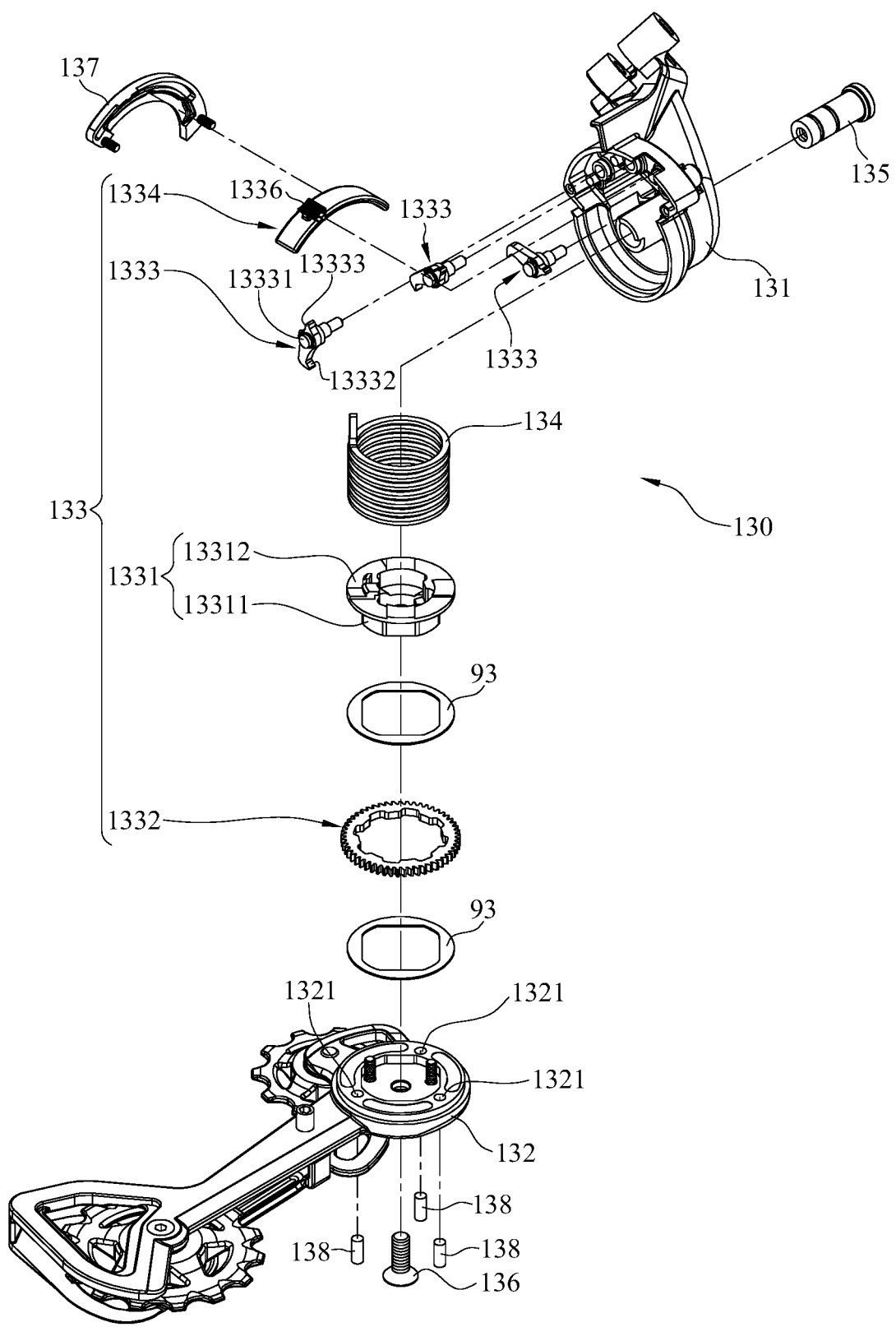
FIGS. 4 and 5 are detail exploded views of the chain guide assembly in FIG. 1 taken from different viewpoints.
Figure 5:
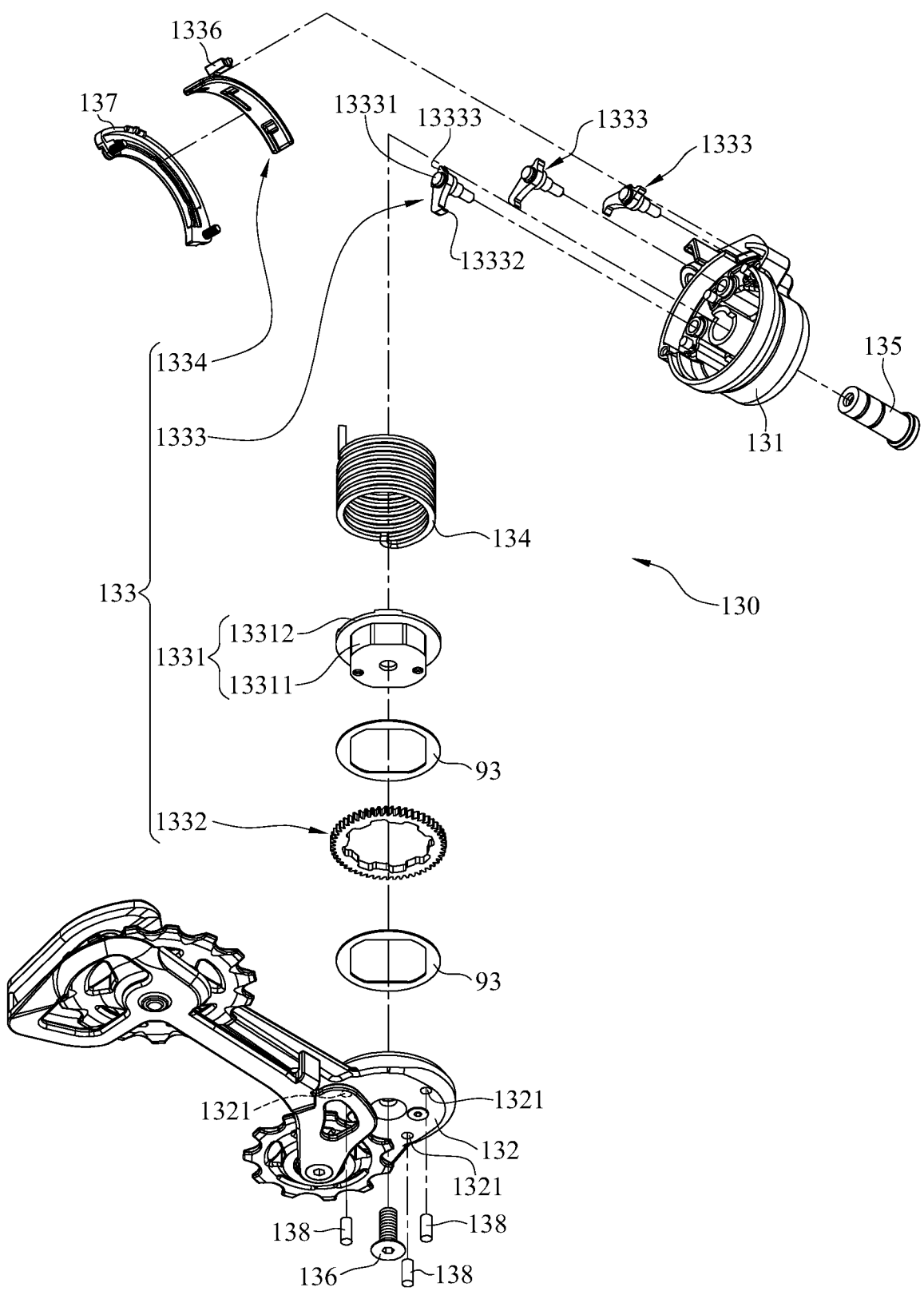
Figure 6:
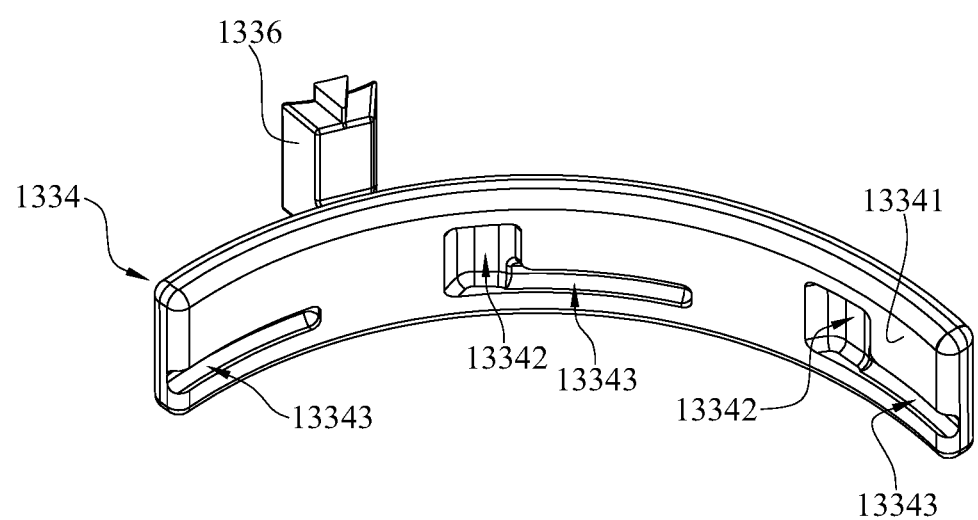
FIG. 6 is a perspective view of a control component of the chain guide assembly in FIG. 3.
Figure 7:
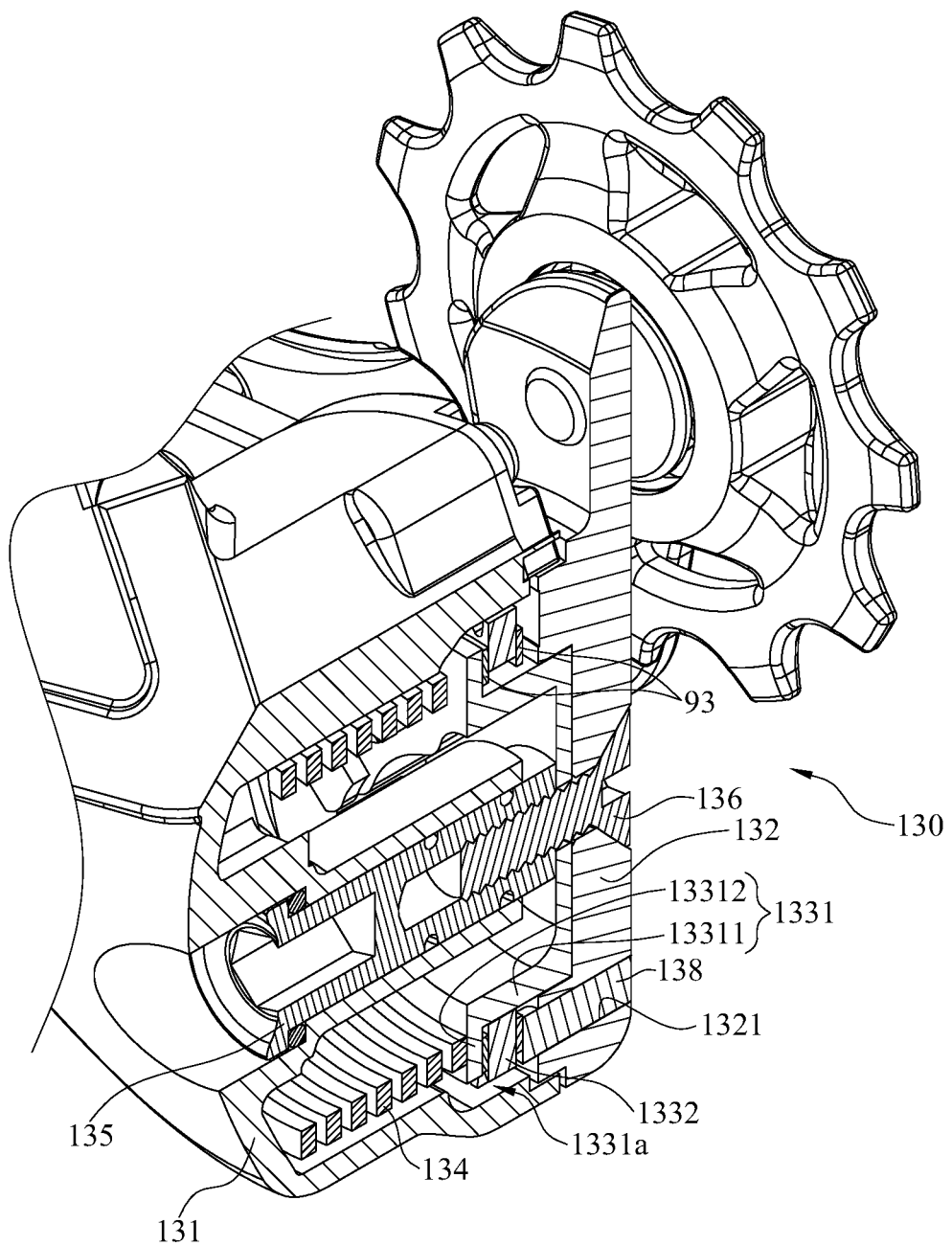
FIG. 7 is a partial cross-sectional view of the chain guide assembly in FIG. 1.

Then, please refer to FIG. 2 to FIG. 7, FIG. 2 is a perspective view of a derailleur of the bicycle in FIG. 1, FIG. 3 is a partial exploded view of a chain guide assembly of the derailleur in FIG. 1, FIGS. 4 and 5 are detail exploded views of the chain guide assembly in FIG. 1 taken from different viewpoints, FIG. 6 is a perspective view of a control component of the chain guide assembly in FIG. 3, and FIG. 7 is a partial cross-sectional view of the chain guide assembly in FIG. 1.

In this embodiment, the chain guide assembly 130 includes a movable member 131, a chain guide 132, a resistance applying assembly 133, a torsion spring 134, a pivot 135, and a fastener 136. The movable member 131 is mounted on the linkage assembly 120, such that the chain guide 132 is pivotable relative to the movable member 131 along two opposite directions (e.g., A and B shown in FIG. 1). In detail, the pivot 135 and the fastener 136 are respectively disposed through the movable member 131 and the chain guide 132, and the fastener 136 is screwed into the pivot 135; that is, the chain guide 132 is pivotably disposed on the movable member 131 via the assembly of the pivot 135 and the fastener 136.

The resistance applying assembly 133 is connected between the movable member 131 and the chain guide 132. Specifically, the resistance applying assembly 133 includes a shaft seat 1331, a first engagement component 1332, a plurality of second engagement components 1333, and a control component 1334.

The shaft seat 1331 includes a seat portion 13311 and a flange portion 13312. The seat portion 13311 is screwed on a side of the chain guide 132 facing the movable member 131. The fastener 136 penetrates through the chain guide 132 and the seat portion 13311 of the shaft seat 1331, and an end of the fastener 136 is inserted into the pivot 135. The flange portion 13312 is located at a side of the seat portion 13311 away from the chain guide 132 and protrudes from the seat portion 13311 in a radial direction of the seat portion 13311. As such, the movable member 131, the flange portion 13312, a lateral surface of the seat portion 13311 and the chain guide 132 together form an annular slot 1331a.

The first engagement component 1332 is, for example, a ratchet wheel. The seat portion 13311 of the shaft seat 1331 is disposed through the first engagement component 1332 so that the first engagement component 1332 is located in the annular slot 1331a and clamped by the flange portion 13312 and the chain guide 132. In this or other embodiments, the shaft seat 1331, the first engagement component 1332, the chain guide 132 and the fastener 136 are tightly assembled together so that the movable member 131 is able to be moved relative to them at the same time. In addition, in this embodiment, the chain guide assembly 130 further includes two washers 93 sleeved on the shaft seat 1331, one is located between the first engagement component 1332 and the chain guide 132, and the other is located between the flange portion 13312 and the first engagement component 1332. The washers 93 increase the friction among the flange portion 13312, the chain guide 132 and the first engagement component 1332. However, the washers 93 are optional, and its quantity and location are not restricted, either. In some other embodiments, the chain guide assembly may only have one washer, and the washer can be disposed between the first engagement component 1332 and the chain guide 132 or between the flange portion 13312 and the first engagement component 1332. Alternatively, in another embodiment, the chain guide assembly may have no washer.

The second engagement components 1333 and the control component 1334 are fixed on a side of the movable member 131 facing the chain guide 132 via a holder 137, and the second engagement components 1333 and the control component 1334 can be moved together with respect to the shaft seat 1331 and the first engagement component 1332. In this embodiment, the holder 137 has a curved groove 1371 located on a surface of the holder 137 facing the movable member 131. The appearance of the control component 1334 is in a curved shape that fits the curved groove 1371, but the arc length of the curved groove 1371 is larger than that of the control component 1334. As such, the control component 1334 is allowed to be slidably disposed on the curved groove 1371 and is movable between an engaged position and a released position.

More specifically, the control component 1334 is slidably disposed on the curved groove 1371, and the control component 1334 has an inner curved surface 13341, a plurality of notches 13342, and a plurality of recesses 13343. The notches 13342 and recesses 13343 are located on the inner curved surface 13341. The inner curved surface 13341 faces the pivot 135 and is substantially perpendicular to the holder 137. In this embodiment, the quantity of the recesses 13343 is three, these three recesses 13343 are arranged along the inner curved surface 13341, and two of them are respectively connected two opposite ends of the inner curved surface 13341. The quantity of the notches 13342 is two, and these two notches 13342 are respectively connected to two of the recesses 13343 and are wider than the recesses 13343.

The second engagement components 1333 are, for example, pawls. The second engagement components 1333 are pivotably disposed on the surface of the holder 137 facing the movable member 131, and the second engagement components 1333 are spaced apart from one another and arranged along the inner curved surface 13341 of the control component 1334. In this embodiment, the quantity of the second engagement components 1333 is three, and the second engagement components 1333 are in contact with the inner curved surface 13341.

In detail, the second engagement components 1333 are pivotably disposed on the holder 137 and are spaced apart and arranged along the periphery of the first engagement component 1332. Each of the second engagement components 1333 includes a pivot portion 13331, an engagement portion 13332 and a tail portion 13333.

The pivot portion 13331 is pivotably disposed on the holder 137, and the engagement portion 13332 and the tail portion 13333 are respectively connected to and located on two opposite sides of the pivot portion 13331. As such, the engagement portion 13332 and the tail portion 13333 can be pivoted relative to the holder 137 via the pivot portion 13331. The engagement portions 13332 correspond to the first engagement component 1332 and can be engaged with teeth (not numbered) of the first engagement component 1332.

Figure 8A:
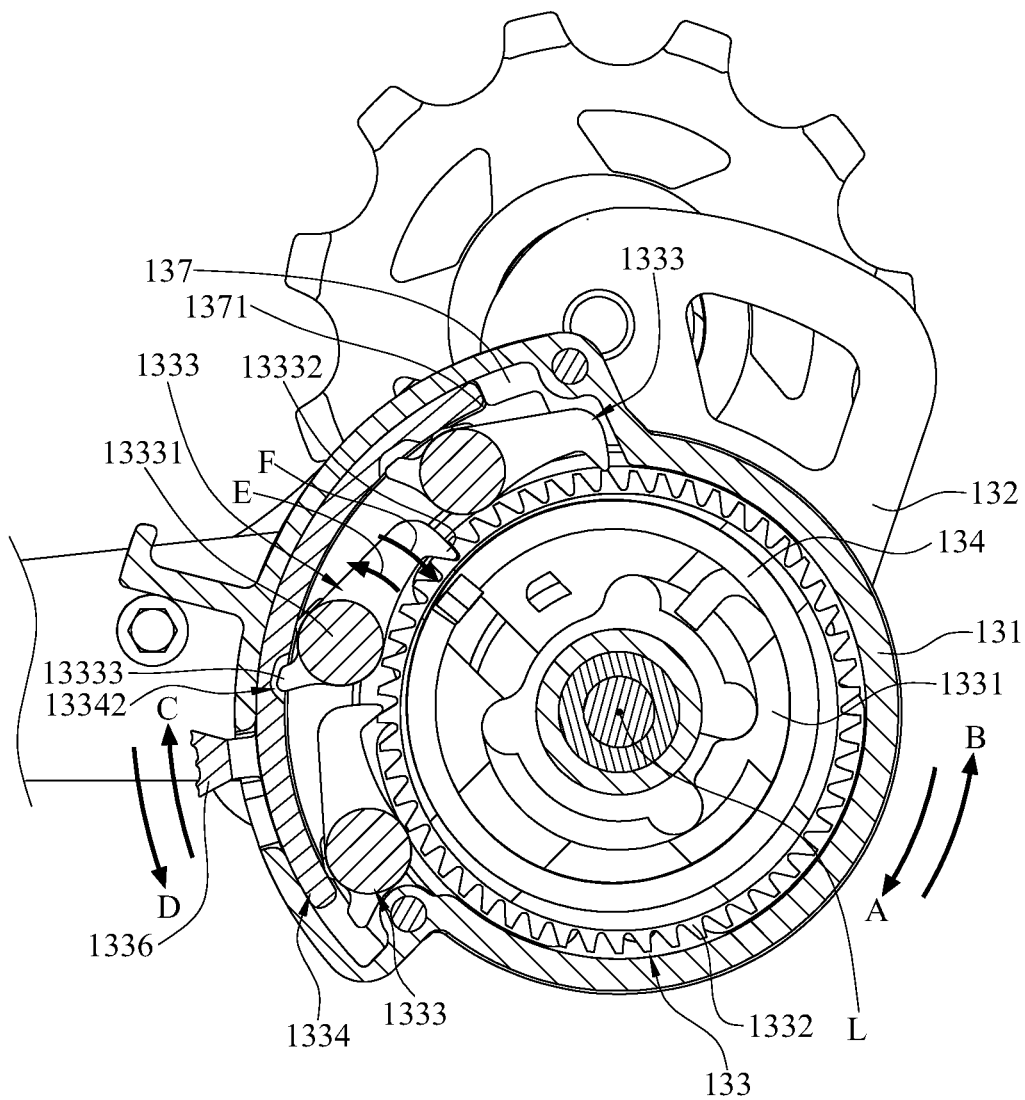
FIGS. 8A and 8B are partial cross-sectional views of the chain guide assembly in FIG. 1 during different positions.
Figure 8B:
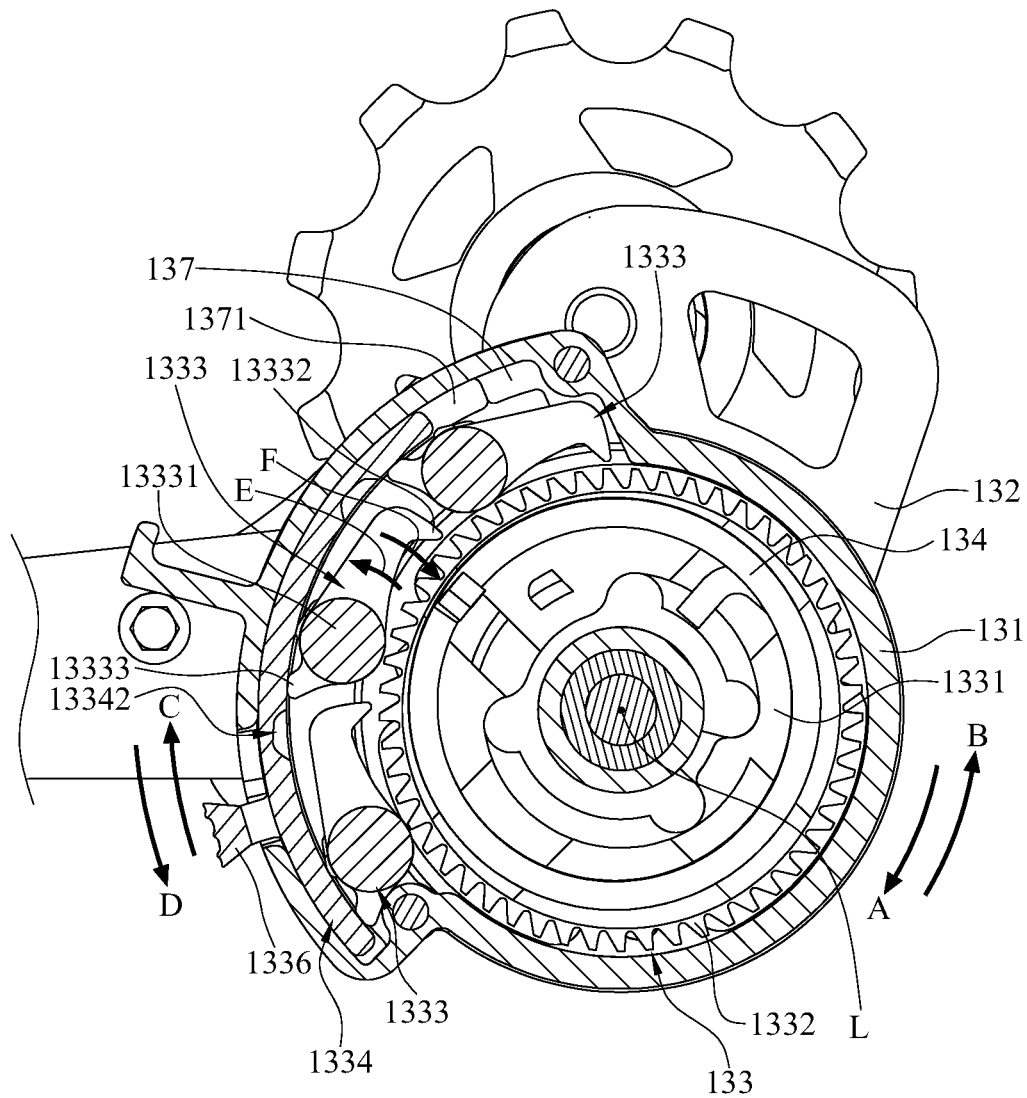

Please refer to FIGS. 8A and 8B. FIGS. 8A and 8B are partial cross-sectional views of the chain guide assembly in FIG. 1 during different positions.

In this embodiment, the engagement portion 13332 of each second engagement component 1333 and the teeth of the first engagement component 1332 are in contact with each other either with their inclined surfaces or vertical surfaces, such that the first engagement component 1332 is only allowed to be moved in one direction relative to the second engagement component 1333 when the second engagement component 1333 is engaged with the first engagement component 1332. That is, the second engagement component 1333 is detachably and unidirectionally engaged with the first engagement component 1332. When the first engagement component 1332 and the second engagement component 1333 are engaged with each other (shown in FIG. 8A), the first engagement component 1332 is only rotatable with respect to the second engagement component 1333 along a rotation direction (as the direction A shown in FIG. 8). The said rotation direction is the only rotatable direction of the first engagement component 1332 relative to the second engagement component 1333 when the first engagement component 1332 is engaged with the second engagement component 1333.

The tail portion 13333 of the pivot portion 13331 is in contact with the inner curved surface 13341 of the control component 1334. In detail, the tail portions 13333 of two of the second engagement components 1333 are respectively located in the two notches 13342 located on the inner curved surface 13341, and the other tail portion 13333 is in contact with an end of the inner curved surface 13341.

In this embodiment, the control component 1334 further has a handle tab 1336 protruding out of an outer surface of the movable member 131. The user is able to slide the control component 1334 from outside by moving the handle tab 1336 and thus moving the control component 1334 relative to the holder 137 along a direction C toward the engaged position (shown in FIG. 8A) or along a direction D toward the released position (shown in FIG. 8B). In this embodiment, the control component 1334 is slidable along a curved line (i.e., the curved groove 1371), and the center of the curved line is located at a central line L of the torsion spring 134. And it is noted that the second engagement components 1333 are spaced apart from one another and arranged along the curved line.

During the slide movement of the control component 1334 shown from FIG. 8A to FIG. 8B or FIG. 8B to FIG. 8A, the control component 1334 pushes the tail portions 13333 of the second engagement components 1333 via the notches 13342 and the end of the control component 1334 so as to pivot the second engagement components 1333 (along a direction E or F) to move at least one engagement portion 13332 to engage with or move the engagement portions 13332 away from the first engagement component 1332. As can be seen from the figures, the second engagement components 1333 are moved with the control component 1334.

In specific, the control component 1334 can be moved to the engaged position (shown in FIG. 8A) along the curved groove 1371 in the direction C to force the second engagement component 1333 to pivot along the direction F so that the engagement portion 13332 engages with the first engagement component 1332. On the other hand, the control component 1334 can be moved to the released position (shown in FIG. 8B) along the curved groove 1371 in the direction D to force the second engagement component 1333 to pivot along the direction E so that the engagement portion 13332 detaches from the first engagement component 1332.

Then, one end of the torsion spring 134 is fixed to a side of the movable member 131 facing the chain guide 132, and another end of the torsion spring 134 is fixed to the shaft seat 1331 that has been assembled with the chain guide 132. In normal condition, the torsion spring 134 constantly forces the chain guide 132 to pivot relative to the movable member 131 along the direction A (shown in FIG. 1), such that the tension pulley 150 disposed on the chain guide 132 can also be moved along the direction A in order to tension the chain 92, thereby preventing the chain 92 from falling off from the sprocket. Meanwhile, the first engagement component 1332 can also be rotated relative to the second engagement components 1333 along the rotation direction (e.g., the direction A) by the chain guide 132. During the rotation of the first engagement component 1332, the teeth of the first engagement component 1332 push the engagement portions 13332 of the second engagement components 1333 and force them to pivot along the direction E.

When the bicycle is riding on bumpy road, hitting a large hole in the road or a sharp bump can put large forces on the bicycle, resulting a force that forces the chain guide 132 to pivot relative to the movable member 131 and the second engagement component 1333 along the direction B (opposite to the rotation direction of the first engagement component 1332). In this moment, at least one second engagement component 1333 is engaged with the first engagement component 1332 so that the tooth of the first engagement component 1332 would be stopped by the engagement portion 13332 of the second engagement component 1333. If the force that makes the chain guide 132 pivot along the direction B is smaller than the friction force produced from the flange portion 13312 and the chain guide 132 clamping the first engagement component 1332, the second engagement component 1333 can stop both the first engagement component 1332 and the chain guide 132 from moving toward the direction B. That is, due to the friction force between the first engagement component 1332 and the chain guide 132, the second engagement component 1333 engaged with the first engagement component 1332 is able to prevent the chain guide 132 from being pivoted along the direction B, thereby preventing slack in the chain 92 and preventing the chain 92 from falling off from the sprocket.

Then, please refer to FIGS. 4, 5 and 7, the chain guide 132 further has at least one through hole 1321 corresponding to a surface of the first engagement component 1332 facing the chain guide 132. In this embodiment, the quantity of the at least one through hole 1321 is three, but it may be modified according to actual requirements. In practical, a pillar 138 can be disposed through the through hole 1321 to press against a side of the first engagement component 1332 facing the chain guide 132 in order to increase a normal force between the first engagement component 1332 and the flange portion 13312. As such, the friction force between the first engagement component 1332 and the chain guide 132 is increased due to the increased normal force, thereby further preventing slack in the chain 92 and preventing the chain 92 falling off from the sprocket.

In addition, it is noted that the quantity of the second engagement components 1333 is plural, and when one of them is engaged with the tooth of the first engagement component 1332, the others may be maintained in positions that are nearly engaged with the first engagement component 1332; that is, the second engagement components 1333 may be in different inclinations with respect to the first engagement component 1332. Therefore, the second engagement components 1333 may not be simultaneously fully engaged with or disengaged from the first engagement component 1332. This configuration can prevent a large movement of the first engagement component 1332 and the second engagement components 1333 during their engagement, thereby much further preventing slack in the chain 92. It should be noted that the quantity of the second engagement components is not restricted; in some other embodiments, the quantity of the second engagement components may be adjusted to one or more than three.

On the other hand, in order to solve the problem that a conventional derailleur having a resistance applying component is difficult in moving the chain among the sprockets, the control component 1334 can be moved from the engaged position (shown in FIG. 8A) to the released position (shown in FIG. 8B) along the direction D so as to pivot the second engagement components 1333 along the direction E to detach the engagement portions 13332 from the first engagement component 1332. By doing so, the teeth of the first engagement component 1332 will not be blocked or stopped by the engagement portions 13332 of the second engagement components 1333, such that the second engagement components 1333 will not provide additional resistance to the chain guide 132, allowing the chain guide 132 to be easily pivoted with respect to the movable member 131 for shifting the chain 92 on the sprockets.

It is note that, although the resistance that the second engagement components 1333 provides to the chain guide 132 is removed when the control component 1334 is moved to the released position, the chain guide 132 is still in a certain level of tension due to the elastic force provided by the torsion spring 134. Therefore, the chain 92 will not be too loose as the control component 1334 is in the released position.

According to the chain guide assembly as discussed above, by sliding the control component, the second engagement component can be pivoted toward and unidirectionally engaged with first engagement component or detached from the first engagement component for allowing the first engagement portion to be rotatable along two opposite directions relative to the second engagement component. Therefore, the resistance caused by the second engagement component can be removed by sliding the control component, such that the chain shifting will be much smooth and easy.

It will be apparent to those skilled in the art that various modifications and variations can be made to the present disclosure. It is intended that the specification and examples be considered as exemplary embodiments only, with a scope of the disclosure being indicated by the following claims and their equivalents.

What is claimed is:

1. A chain guide assembly, configured to be mounted on a linkage assembly of a bicycle derailleur, the chain guide assembly comprising:
    a movable member, configured to be mounted on the linkage assembly;
    a chain guide, pivotably disposed on the movable member; and
    a resistance applying assembly, connected between the movable member and the chain guide, the resistance applying assembly comprising:
        a shaft seat comprising a seat portion and a flange portion, wherein the seat portion is fixed on the chain guide, the flange portion is located at a side of the seat portion away from the chain guide and protrudes from the seat portion in a radial direction of the seat portion;
        a first engagement component, wherein the seat portion is disposed through the first engagement component, and the first engagement component is clamped by the flange portion and the chain guide;
        a control component, disposed on the movable member and movable between an engaged position and a released position; and
        at least one second engagement component, comprising a pivot portion, an engagement portion, and a tail portion, wherein the pivot portion is located between and connected to the engagement portion and the tail portion, the pivot portion is pivotably disposed on the movable member, the control component is in contact with the tail portion, and the at least one second engagement component is movable with the control component;
    wherein when the control component is in the engaged position, the first engagement component is unidirectionally and detachably engaged with the engagement portion of the at least one second engagement component so that the first engagement component is only rotatable relative to the at least one second engagement component along a rotation direction; when the control component is moved from the engaged position to the released position, the tail portion of the at least one second engagement component is pushed by the control component to make the engagement portion detach from the first engagement component so that the first engagement component is rotatable relative to the at least one second engagement component along the rotation direction and a direction opposite to the rotation direction.

2. The chain guide assembly according to claim 1, further comprising a torsion spring, wherein the torsion spring is connected to and located between the movable member and the chain guide and in order to force the chain guide to pivot relative to the movable member along the rotation direction.

3. The chain guide assembly according to claim 2, wherein the control component is slidable along a curved line, and a center of the curved line is located at a central line of the torsion spring.

4. The chain guide assembly according to claim 3, wherein the quantity of the at least one second engagement component is plural, and the second engagement components are spaced apart from each other and are arranged along the curved line.

5. The chain guide assembly according to claim 1, wherein the chain guide has at least one through hole corresponding to the first engagement component, wherein a pillar is configured to be disposed through the at least one through hole; when the pillar is disposed through the at least one through hole, a side of the first engagement component facing the chain guide is pressed against by the pillar so that a normal force between the first engagement component and the flange portion is increased.

6. The chain guide assembly according to claim 1, wherein the movable member has a curved groove, the control component is slidably located in the curved groove, the control component has an inner curved surface and at least one notch located on the inner curved surface, the tail portion of the at least one second engagement component is located in the at least one notch; when the control component is moved between the engaged position and the released position, the at least one second engagement component is pivoted by the control component via the at least one notch so that the at least one second engagement component is unidirectionally engaged with the first engagement component or moved away from the first engagement component.

7. The chain guide assembly according to claim 1, wherein the control component has a handle tab protruding out of an outer surface of the movable member.

8. The chain guide assembly according to claim 1, wherein the quantity of the at least one second engagement component is plural, the first engagement component is a ratchet wheel, the second engagement components are pawls, and the second engagement components are arranged along a periphery of the first engagement component.

9. The chain guide assembly according to claim 8, wherein the second engagement components are in different inclinations with respect to the first engagement component.

10. The chain guide assembly according to claim 1, further comprising at least one washer sleeved on the shaft seat and located between the first engagement component and the chain guide or between the first engagement component and the flange portion.

* * * * *